United States Patent
McKenney

(10) Patent No.: US 10,613,913 B1
(45) Date of Patent: Apr. 7, 2020

(54) FUNNEL LOCKING FOR NORMAL RCU GRACE PERIOD REQUESTS

(71) Applicant: International Business Machines Corporation, Armonk, NY (US)

(72) Inventor: Paul E. McKenney, Beaverton, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/153,731

(22) Filed: Oct. 6, 2018

(51) Int. Cl.
| | |
|---|---|
| G06F 9/46 | (2006.01) |
| G06F 9/52 | (2006.01) |
| G06F 13/16 | (2006.01) |
| G06F 12/0877 | (2016.01) |

(52) U.S. Cl.
CPC .......... G06F 9/528 (2013.01); G06F 9/468 (2013.01); G06F 12/0877 (2013.01); G06F 13/1605 (2013.01)

(58) Field of Classification Search
CPC ...... G06F 9/468; G06F 9/5016; G06F 9/5022; G06F 9/526; G06F 9/528; G06F 12/0877; G06F 12/126; G06F 13/1605; G06F 16/2308; G06F 16/2336; G06F 16/2343; G06F 16/2365
USPC ................................. 710/200; 711/155, 159
See application file for complete search history.

(56) References Cited

U.S. PATENT DOCUMENTS

| | | |
|---|---|---|
| 5,442,758 A | 8/1995 | Slingwine et al. |
| 5,608,893 A | 4/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,353,346 B2 | 4/2008 | McKenney et al. |
| 7,349,879 B2 | 6/2008 | McKenney et al. |
| 7,395,263 B2 | 7/2008 | McKenney |

(Continued)

OTHER PUBLICATIONS

P. McKenney, "srcu: Parallelize callback handling", [PATCH tip/core/rcu 40/40], Apr. 12, 2017, 21 pages.

(Continued)

*Primary Examiner* — Gary J Portka
(74) *Attorney, Agent, or Firm* — Noah Sharkan et al.; Blanche E. Schiller, Esq.

(57) ABSTRACT

A funnel locking technique for normal read-copy update (RCU) grace period requests. Based on a calculated future normal RCU grace period, a traversal is initiated of a funnel lock embodied as a hierarchical tree of nodes. The funnel-lock traversal starts at an initial node whose lock is held throughout the funnel-lock traversal. For each node accessed during the funnel-lock traversal that is not the initial node, a lock on the node is held while accessing that node. For each accessed node, the funnel-lock traversal is terminated if the future normal RCU grace period has already been requested at that node, if the node believes that the future normal RCU grace period as already started, or if the node is not the initial node and believes that any normal RCU grace period is underway. Otherwise, a request for the future normal RCU grace period is recorded at the node.

20 Claims, 5 Drawing Sheets

(56) References Cited

U.S. PATENT DOCUMENTS

| | | | |
|---|---|---|---|
| 7,395,383 | B2 | 7/2008 | McKenney |
| 7,426,511 | B2 | 9/2008 | McKenney |
| 7,454,581 | B2 | 11/2008 | McKenney et al. |
| 7,472,228 | B2 | 12/2008 | McKenney et al. |
| 7,653,791 | B2 | 1/2010 | McKenney |
| 7,689,789 | B2 | 3/2010 | McKenney et al. |
| 7,734,879 | B2 | 6/2010 | McKenney et al. |
| 7,734,881 | B2 | 6/2010 | McKenney et al. |
| 7,747,805 | B2 | 6/2010 | McKenney |
| 7,814,082 | B2 | 10/2010 | McKenney |
| 7,818,306 | B2 | 10/2010 | McKenney et al. |
| 7,904,436 | B2 | 3/2011 | McKenney |
| 7,953,708 | B2 | 5/2011 | McKenney et al. |
| 7,953,778 | B2 | 5/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,407,503 | B2 | 3/2013 | McKenney |
| 8,495,641 | B2 | 7/2013 | McKenney |
| 8,615,771 | B2 | 12/2013 | McKenney |
| 8,706,706 | B2 | 4/2014 | McKenney |
| 8,874,535 | B2 | 10/2014 | McKenney |
| 8,924,655 | B2 | 12/2014 | McKenney |
| 8,938,631 | B2 | 1/2015 | McKenney |
| 8,972,801 | B2 | 3/2015 | McKenney |
| 9,003,420 | B2 | 4/2015 | McKenney |
| 9,189,413 | B2 | 11/2015 | McKenney |
| 9,250,978 | B2 | 2/2016 | McKenney |
| 9,256,476 | B2 | 2/2016 | McKenney |
| 9,348,765 | B2 | 5/2016 | McKenney |
| 9,396,226 | B2 | 6/2016 | McKenney |
| 9,389,925 | B2 | 7/2016 | McKenney |
| 9,519,307 | B2 | 12/2016 | McKenney |
| 9,552,236 | B2 | 1/2017 | McKenney |
| 9,720,836 | B2 | 8/2017 | McKenney |
| 9,886,329 | B2 | 2/2018 | McKenney |
| 9,965,432 | B2 | 5/2018 | McKenney |
| 10,282,230 | B2 * | 5/2019 | McKenney ............... G06F 9/50 |
| 2008/0082532 | A1 | 4/2008 | McKenney |
| 2013/0061071 | A1 | 3/2013 | McKenney |
| 2018/0046468 | A1 | 2/2018 | McKenney |
| 2018/0060086 | A1 | 3/2018 | McKenney |
| 2018/0095666 | A1 | 4/2018 | McKenney |
| 2018/0165125 | A1 | 6/2018 | McKenney |
| 2018/0267840 | A1 | 9/2018 | McKenney |
| 2019/0147077 | A1 * | 5/2019 | McKenney ......... G06F 16/2315 707/615 |

OTHER PUBLICATIONS

P. McKenney, "rcu_cbs_complete( )" Linux Kernel Version 4.17.9, Aug. 4, 2017, 1 page.

P. McKenney, "rcu_start_future_gp( )" Linux Kernel Version 4.17.9, Aug. 4, 2017, 2 pages.

P. McKenney et al., "Read-Copy Update: Using Execution History to Solve Concurrency Problems," PDCS, Oct. 1998, 11 pages.

P. McKenney et al., "Read-Copy Update," 2001 Ottawa Linux symposium, Jul. 2001, 22 pages.

H. Lindar et al., "Scalability of the Directory Entry Cache," 2002 Ottawa Linux Symposium, Jun. 26, 2002, pp. 289-300.

P. McKenney et al.,"Read-Copy Update," 2002 Ottawa Linux Symposium, Jul. 8, 2002, 32 pages.

A. Arcangeli et al., "Using Read-Copy-Update Techniques for System V IPC in the Linux 2.5 Kernel," 2003 FREENIX, Jun. 14, 2003, 13 pages.

P. McKenney et al., "Using RCU in the Linux 2.5 Kernel," Linux Journal, Oct. 1, 2003, 11 pages.

P. McKenney et al., "Scaling dcache with RCU," Linux Journal, Jan. 1, 2004, 12 pages.

P. McKenney, "RCU vs. Locking Performance on Different CPUs," 2004 Linux.conf.au, 2004, 18 pages.

P. Zijlstra, "[PATCH] slab: document SLAB_DESTROY_BY_RCU", LKML.org, Nov. 13, 2008, 1 page.

D. Sarma et al., "Making RCU Safe for Deep Sub-Millisecond Response Realtime Applications," 2004 USENIX (UseLinux track) Jun. 2004, 9 pages.

P. McKenney et al., "Extending RCU for Realtime and Embedded Workloads," 2006 Ottawa Linux Symposium, Aug. 11, 2006, 15 pages.

P. McKenney, "Sleepable RCU", LWN.net, Oct. 9, 2006, 10 pages.

T. Gleixner, High Resolution Timers / Dynamic Tics—V2, LWN.net, Oct. 31, 2006, 5 pages.

P. McKenney, "RCU and Unloadable Modules", LWN.net, Jan. 14, 2007, 4 pages.

P. McKenney, "Using Promela and Spin to verify parallel algorithms", LWN.net, Aug. 1, 2007, 11 pages.

P. McKenney, "The design of preemptible read-copy-update," LWN.net, Oct. 8, 2007, 27 pages.

T. Hart et al., "Performance of memory reclamation for lockless synchronization", Journal of Parallel and Distributed Computing, Dec. 2007, pp. 1270-1285.

P. McKenney, "What is RCU, Fundamentally", LWN.net, Dec. 17, 2007, 15 pages.

P. McKenney, What is RCU? Part 2: Usage, LWN.net,Dec. 24, 2007, 15 pages.

P. McKenney, RCU part 3: the RCU API, LWN.net, Jan. 7, 2008, 7 pages.

P. McKenney, "Integrating and Validating dynticks and Preemptible RCU," LWN.net, Apr. 22, 2008, 19 pages.

D. Guniguntala et al., "The read-copy-update mechanism for supporting real-time applications on shared-memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

P. McKenney, "Hierarchical RCU," LWN.net, Nov. 4, 2008, 19 pages.

P. McKenney, "Using a Malicious User-Level RCU to Torture RCU-Based Algorithms", linux.conf.au, Jan. 2009, 51 pages.

M. Desnoyers, "Low-Impact Operating System Tracing", University of Montreal, PhD Thesis, Dec. 2009, 233 pages.

P. McKenney, "RCU: The Bloatwatch Edition", LWN.net, Mar. 17, 2009, 9 pages.

P. McKenney, "Expedited "big hammer" RCU grace periods", LKML.org, Jun. 25, 2009, 2 pages.

P. McKenney, "RCU cleanups and simplified preemptable RCU", LKML.org, Jul. 23, 2009, 1 page.

P. McKenney, "Deterministic Synchronization in Multicore Systems: the Role of RCU", Aug. 18, 2009, pp. 1-9.

P. McKenney, "Simplicity Through Optimization", linux.conf.au, Jan. 2010, 109 pages.

P. McKenney, "The RCU API, 2010 Edition", LWN.net, Dec. 8, 2010, 11 pages.

J. Triplett et al., "Resizable, Scalable, Concurrent Hash Tables via Relativistic Programming", ACM-SIGOPS Operating System Review vol. 44, Issue 3, Jul. 2010, 14 pages.

M. Desnoyers et al., "User-Level Implementations of Read-Copy Update", IEEE Transactions on Parallel and Distributed Systems, vol. x, No. y, Jul. 2009, pp. 1-14.

P. McKenney, "Making RCU Safe for Battery-Powered Devices", Embedded Linux Conference, Feb. 15, 2012, pp. 1-66.

P. McKenney, "Real-Time Response on Multicore Systems: It Is Bigger Than You Think", OSPERT '12 Workshop, Jul. 10, 2012, pp. 1-34.

P. McKenney, "Getting RCU Further Out of the Way", 2012 Linux Plumbers Conference, Real Time Microconference, Aug. 31, 2012, 31 pages.

P. McKenney, "The new visibility of RCU processing", LWN.net, Oct. 10, 2012, 4 pages.

(56) References Cited

OTHER PUBLICATIONS

P. McKenney, "CPU, Hotplug, RCU, and big.LITTLE", Linaro Connect, Nov. 1, 2012, 33 pages.
P. McKenney, Bare-Metal Multicore Performance in a General-Purpose Operating System, Multicore World, Feb. 2013, 66 pages.
P. McKenney, "Simplifying RCU", LWN.net, Mar. 6, 2013.
P. McKenney, "User-space RCU", LWN.net, Nov. 13, 2013, 15 pages.
J. Corbet, "The RCU-tasks subsystem", LWN.net, Jul. 30, 2014.
P. McKenney, "The RCU API, 2014 Edition", LWN.net, Sep. 4, 2014.
P. McKenney, "What Happens When 4096 Cores All Do synchronize_rcu_expedited( )?", linux.conf.au, Geelong, Australia, Feb. 3, 2015.
L. Lian et al., "Verification of the Tree-Based Hierarchical Read-Copy Update the Linux Kernel", Cornell University Library, pp. 1-14, Oct. 11, 2016.
P. McKenney, "A Tour Through RCU's Requirements", LWN.net; 2015, 36 pages.
N. Shavit et al., "Combining Funnels: A Dynamic Approach to Software Combining", Journal of Parallel and Distributed Computing, vol. 60 issue 11, Nov. 2000, pp. 1355-1387.
P. McKenney, "A Tour Through TREE_RCU's Expedited Grace Periods", downloaded from <https://www.kernel.org/doc/Documentation/RCU/Design/Expedited-Grace-Periods/Expedited-Grace-Periods.html, Jun. 28, 2016, 12 pages.
P. McKenney, "rcu: Enforce expedited-GP fairness via funnel wait queue", LKML [PATCH tip/core/rcu 11/16], <https://klml.org/lkml/2016/4/12/519, 6 pages.

* cited by examiner

FUNNEL LOCKING FOR NORMAL RCU GRACE PERIOD REQUESTS

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory, and such operation may thus be referred to as a reclaimer. In certain RCU implementations, the second-phase update operation may comprise something else, such as changing an operational state according to the first-phase update.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. For RCU implementations embodied in operating system kernels, a context switch, an idle loop, and user mode execution may be treated as implicit quiescent states. More generally, a quiescent state may be delineated by a kernel code path being outside an RCU read-side critical section. RCU read-side primitives such as rcu_read_lock( ) and rcu_read_unlock( ) are commonly used by the readers to denote the beginning and end of such critical sections.

An RCU update may be performed by implementing a first phase update operation, then registering a callback that will eventually be processed at the end of an RCU grace period to free a data element made obsolete by the first phase update operation (or to perform other destructive-to-reader actions). Advantageously, callbacks requested by one or more updaters can be batched on multi-segment callback lists and processed as a group when their required RCU grace period has ended. This allows RCU grace period overhead to be amortized over plural deferred update operations. An RCU state machine mechanism is used to start and end RCU grace periods and advance the RCU callbacks, one grace period at a time, through several stages of callback list processing.

A typical RCU callback list may comprise three or four segments that segregate the batched RCU callbacks into callback groups that are processed at the end of different RCU grace periods. A RCU callback must advance through each callback list segment before it is ready for invocation. In Linux® RCU implementations, there is typically one RCU callback list per processor, and list tail pointers are used to divide each callback list into four segments.

Past Linux® RCU implementations have calculated future grace period numbers needed by RCU callbacks on different segments of the RCU callback lists. The future grace period numbers are assigned to the corresponding callback list segments and requests for the future RCU grace period are periodically made on behalf of the RCU callbacks. For so-called "normal" RCU grace periods, both the future grace period request operation, as well as subsequent fail-safe checks to determine whether a future grace period is in fact needed, require that a global lock be acquired. In systems with multiple processors, there can be excessive contention on the global lock resulting from such operations, which can degrade RCU performance and limit scalability. The present disclosure addresses this contention problem.

SUMMARY

A method, system and computer program product implement a funnel locking technique for normal read-copy update (RCU) grace period requests. A future normal RCU grace period may be calculated based on the status of a current RCU grace period. A traversal is initiated of a funnel lock embodied as a hierarchical tree of nodes having a single top level root node, one or more bottom level leaf nodes, and zero or more intermediate level nodes. The funnel-lock traversal starts at an initial node whose node lock is held throughout the funnel-lock traversal. For each node accessed during the funnel-lock traversal that is not the initial node, a node lock is held on the node while accessing that node. For each node accessed during the funnel-lock traversal, a check is made of future normal RCU grace period request information maintained by the node to determine whether a first condition exists wherein the future normal RCU grace period has already been requested at that node. Responsive to the first condition being determined to exist, the funnel-lock traversal is terminated. For each node accessed during the funnel-lock traversal, a check is made of current normal RCU grace period information maintained by the node to determine whether a second condition exists wherein the future normal RCU grace period has already started. Responsive to the second condition being determined to exist, the funnel-lock traversal is terminated. For each node accessed during the funnel-lock traversal that is not the initial node, a check is made of the current normal RCU grace period information maintained by the node to determine whether a third condition exists wherein any normal RCU grace period is currently underway. Responsive to the third condition being determined to exist, the funnel-lock traversal is terminated. For each node accessed during the funnel-lock traversal wherein neither the first condition, the second condition nor the third condition are determined to exist, the future normal RCU grace period request information maintained by the node is updated to record a request for the future normal RCU grace period.

BRIEF DESCRIPTION OF THE DRAWINGS

The foregoing and other features and advantages will be apparent from the following more particular description of example embodiments, as illustrated in the accompanying Drawings.

DETAILED DESCRIPTION

Figure 1:
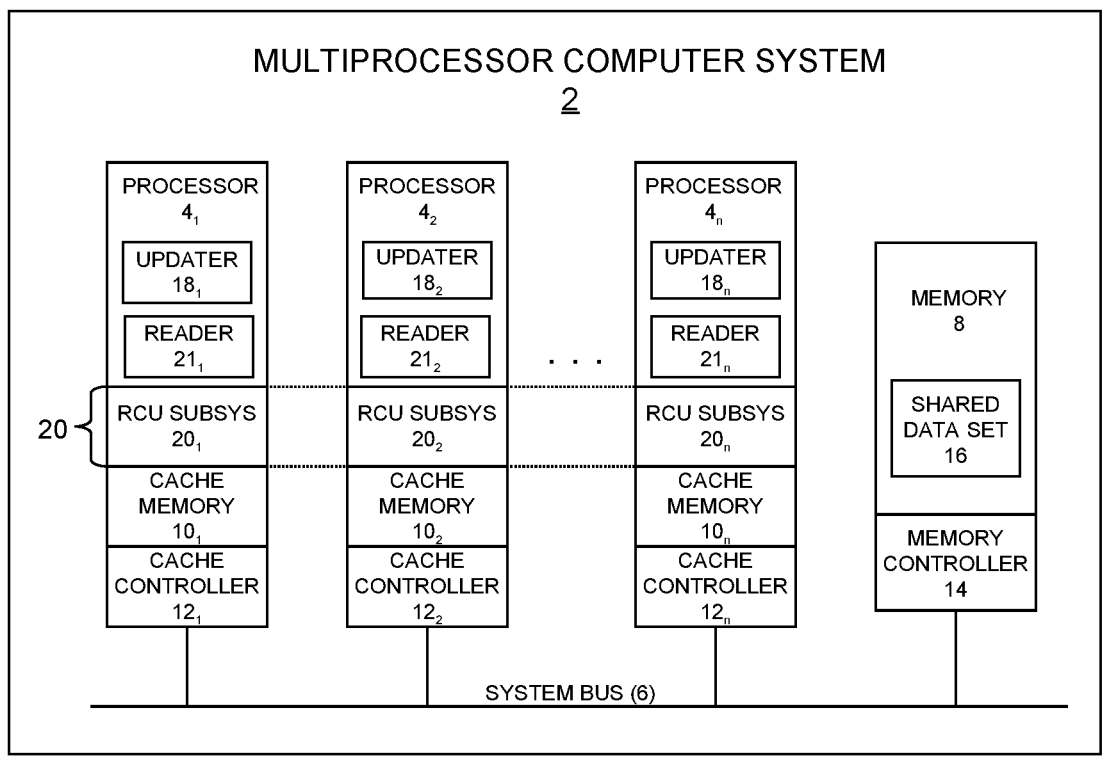
FIG. 1 is a functional block diagram showing an example multiprocessor computing system.

Turning now to the Figures, wherein like reference numerals represent like elements in all of the several views, FIG. 1 illustrates an example multiprocessor computer system 2 in which a funnel-locking technique for normal RCU grace period requests may be implemented. The computer system 2 may include a plurality of processors 4 (e.g., $4_1, 4_2 \ldots 4_n$) a system bus 6, and a main program memory 8. There may also be cache memories 10 (e.g., $10_1, 10_2 \ldots 10_n$) and cache controllers 12 (e.g., $12_1, 12_2 \ldots 12_n$) respectively associated with the processors 4. The cache memories 10 may be implemented in several levels (e.g., as level 1, level 2 and level 3 caches) and the cache controllers 12 may collectively represent the cache controller logic that supports each cache level. A memory controller 14 may be associated with the main memory 8. The memory controller 14 may reside separately from the processors 4, for example, as part of a discrete chipset, or alternatively, could be provided by plural memory controller instances that are respectively integrated with the processors 4.

The computer system 2 may represent any of several different types of computing apparatus. Such computing apparatus may include, but are not limited to, general purpose computers, special purpose computers, portable computing devices, portable computing-communication devices (such as smartphones), media player devices, set-top devices, embedded systems, and many other types of information handling machines. The term "processor" as used with reference to the processors 4 encompasses any instruction execution device capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). The processors 4 may be situated within a single computing device or node (e.g., as part of a single-node SMP system) or they may be distributed over plural nodes (e.g., as part of a NUMA system, a cluster, or a cloud). The main memory 8 may be implemented using any suitable type of tangible storage medium capable of storing data in computer readable form for use in program execution, including but not limited to, any of various types of random access memory (RAM) (such as DRAM), various flavors of programmable read-only memory (PROM) (such as flash memory), and other types of primary storage (i.e., program memory). The cache memories 10 may likewise be implemented using any suitable type of primary storage, including but not limited to SRAM.

Each processor 4 is operable to execute program instruction logic under the control of program instructions stored in the main memory 8 (or elsewhere). As part of this program execution logic, RCU update operations (updaters) 18 may execute within a process, thread, or other execution context (hereinafter "task") on any of the processors 4. Each RCU updater 18 may run periodically to perform updates on a set of shared data 16 that may also be stored in the main memory 8 (or elsewhere). In FIG. 1, reference numerals $18_1$, $18_2 \ldots 18_n$ illustrate individual data updaters that respectively execute on the several processors $4_1, 4_2 \ldots 4_n$. The updates performed by an RCU updater 18 can include modifying elements of a linked list, inserting new elements into the list, deleting elements from the list, and other types of operations. To facilitate such updates, the processors 4 may be programmed from instructions stored in the main memory 8 (or elsewhere) to implement a read-copy update (RCU) subsystem 20 as part of their data processing functions. In FIG. 1, reference numbers $20_1, 20_2 \ldots 20_n$ represent individual RCU instances that may respectively periodically execute on the several processors $4_1, 4_2 \ldots 4_n$. Operational details of the RCU subsystem 20 are described below.

Any given processor 4 may also periodically execute RCU read operations (readers) 21. Each RCU reader 21 may run from program instructions stored in the main memory 8 (or elsewhere) in order to periodically perform read operations on the set of shared data 16 stored in the main memory (or elsewhere). In FIG. 1, reference numerals $21_1, 21_2 \ldots 21_n$ illustrate individual RCU reader instances that may respectively execute on the several processors $4_1, 4_2 \ldots 4_n$. Such RCU read operations will typically be performed far more often than RCU updates, this being one of the premises underlying the use of read-copy update. Moreover, it is possible for several of the RCU readers 21 to maintain simultaneous references to one of the shared data elements 16 while an RCU updater 18 updates the same data element.

During operation of the computer system 2, an RCU updater 18 may occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may invoke an RCU primitive such as call_rcu( ) to register a callback for deferred destruction of the pre-update view of the data by the RCU subsystem 20 following the completion of a future normal RCU grace period (second-phase update). The grace period processing performed by the RCU subsystem 20 may entail starting new normal grace periods and detecting the end of old normal grace periods so that the RCU subsystem 20 may determine when it is safe to free stale data (or take other destructive-to-reader actions).

Figure 2:
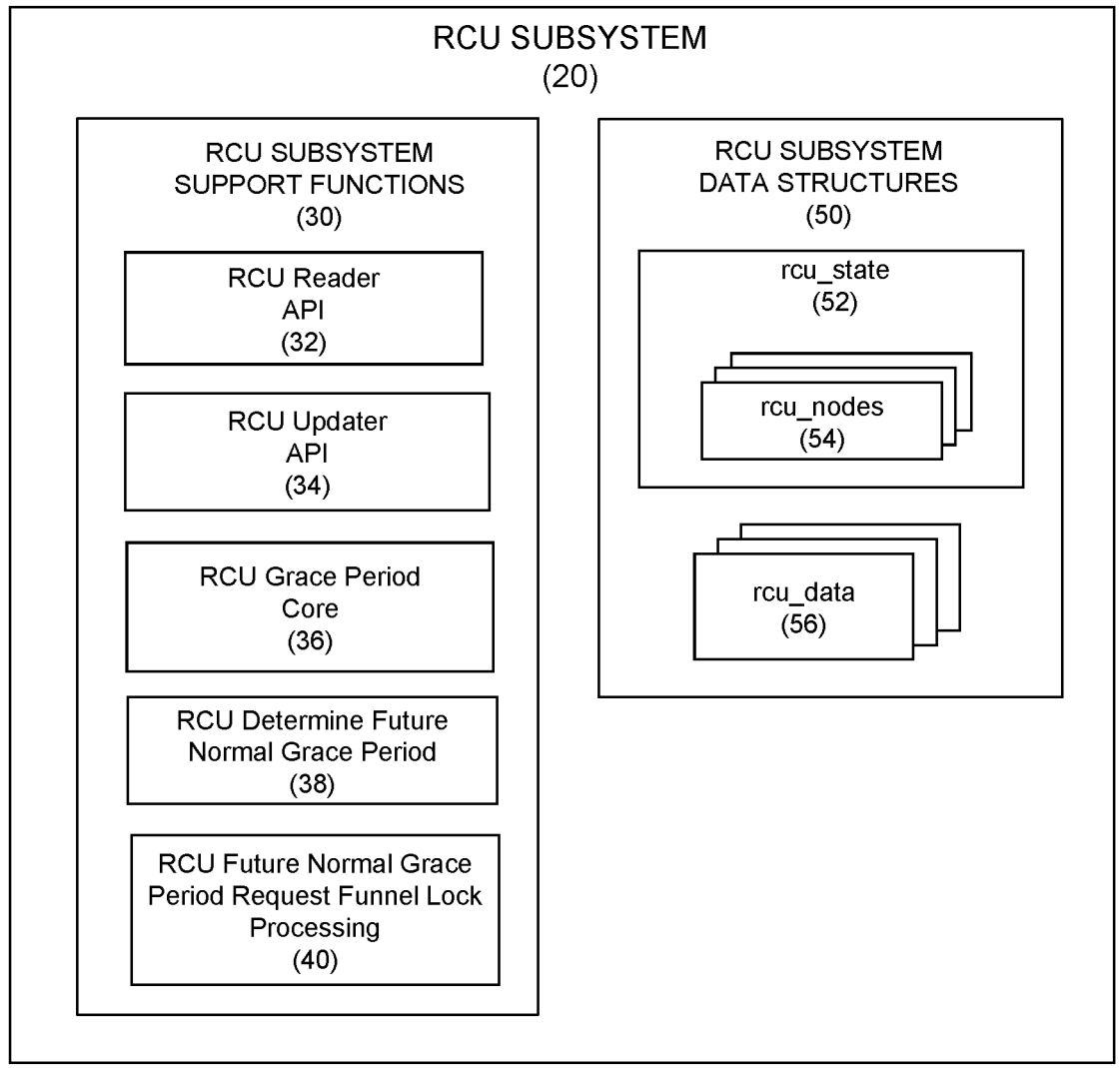
FIG. 2 is a functional block diagram showing an example RCU subsystem.

Turning now to FIG. 2, example components of the RCU subsystem 20 are shown. Among these components is a set of RCU subsystem support functions 30, namely, an RCU reader API (Application Programming Interface) 32, an RCU updater API 34, and an RCU grace period core component 36.

The RCU reader API 32 may comprise a reader registration component and a reader unregistration component that are respectively invoked by readers 21 as they enter and leave their RCU read-side critical sections to read shared data 16. In an example embodiment, the reader registration and unregistration components may be respectively implemented using the rcu_read_lock( ) and rcu_read_unlock( ) primitives found in existing Linux® RCU implementations.

The RCU updater API 34 may comprise one or more primitives for implementing the second (deferred update) phase of data updates. In an embodiment, an asynchronous primitive such as call_rcu( ) may be provided for use by the RCU updaters 18 to register RCU callbacks representing requests for deferred removal of shared data 16 that may be referenced by the RCU readers 21 until a normal RCU grace period has elapsed. A synchronous primitive such as synchronize_rcu( ) may also be provided for use by the RCU updaters 18. In existing Linux® RCU implementations, the synchronize_rcu( ) primitive registers a callback that wakes up the RCU updater 18 at the end of a normal RCU grace period.

The RCU grace period core 36 may include a set of functions that cooperate to perform various normal RCU grace period processing operations. Such operations may include starting new normal RCU grace periods, reporting per-processor quiescent states, cleaning up RCU data structures at the end of old normal RCU grace periods, managing per-processor RCU callback lists, and invoking RCU callbacks as normal RCU grace periods complete. For efficiency reasons, such as reducing real-time latency, some of functions of the RCU grace period core 36 may operate within the context of a kernel thread, such as a Linux® kthread. For example, existing Linux® RCU implementations utilize an RCU grace-period kthread containing an infinite loop that initializes, waits for, and cleans up after each normal RCU grace period. Other functions of the RCU grace period core 36 may operate in softirq context. For example, existing Linux® RCU implementations implement an RCU_SOFTIRQ context whose handler is named rcu_process_callbacks( ), and is scheduled from the Linux® scheduling-clock interrupt. The rcu_process_callbacks( ) handler reports processor quiescent states, advances RCU callbacks on the per-processor RCU callback lists, wakes up per-processor RCU-callback kthreads for RCU callbacks that are ready to be invoked, detects the end of normal RCU grace periods, and wakes up the RCU grace-period kthread when such detection occurs.

Two additional components of the RCU subsystem support functions 30 include a component 38 named "RCU determine future normal grace period," and a component 40 named "RCU future normal grace period request funnel lock processing." These components are described in more detail below.

With continuing reference now to FIG. 2, the RCU subsystem 20 may further include a set of RCU subsystem data structures 50. These data structures include an rcu_state structure 52 having embedded therein (e.g., as a linear array) a combining tree hierarchy of rcu_node structures 54. The combining tree of rcu_node structures 54 tracks information needed to determine when normal RCU grace periods have elapsed. Such tracked information may include, within each rcu_node structure 54, normal RCU grace period sequence numbers together with various quiescent state reporting and tracking structures that identify processors 4 which have or have not passed through a quiescent state.

Each leaf rcu_node structure 54 may have a set of a per-processor rcu_data structures 56 assigned to it. Each rcu_data structure 56 represents one processor in the computer system 2 and can be used to maintain RCU-related information specific to that processor, such as RCU callback lists, quiescent-state and grace-period handling information, rcu_dynticks information that indicates whether or not a given processor 4 is in an offline or lower-power idle state, and other data.

Example fields of the rcu_state structure 52, the rcu_node structures 54, and the rcu_data structures 56 will now be described in more detail with reference to FIG. 3. In an embodiment, the rcu_state structure 52, the rcu_node structures 54, and the rcu_data structures 56 may be respectively named "rsp," "rnp," and "rdp."

Figure 3:
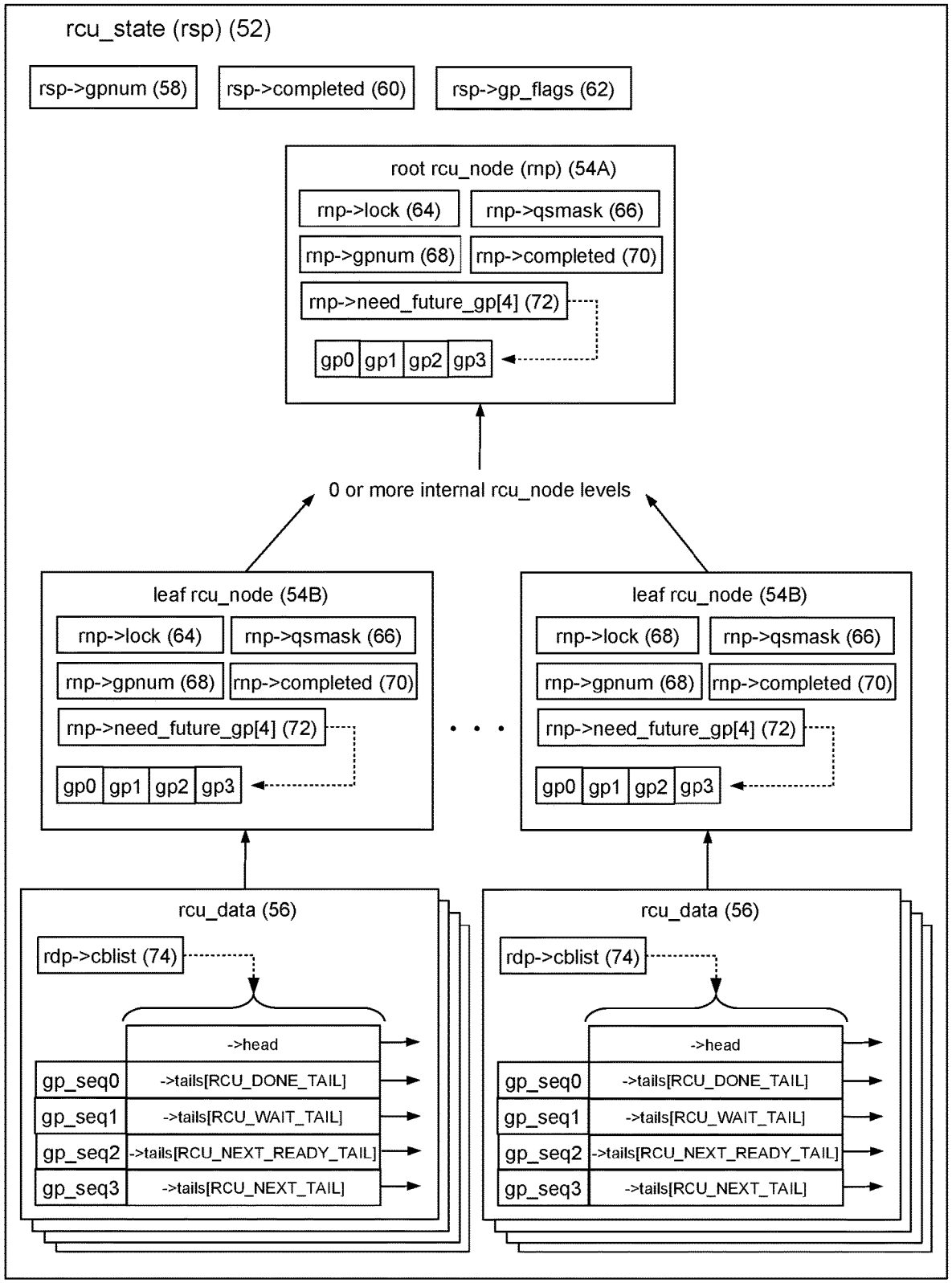
FIG. 3 is a functional block diagram showing an example RCU combining tree of nodes.

Turning first to the rcu_state structure 52, FIG. 3 illustrates an embodiment that includes a root rcu_node structure 54A, zero or more levels of internal rcu_node structures 54, and a set of leaf rcu_node structures 54B. Each leaf rcu_node structure 54B has a set of a per-processor rcu_data structures (rdp) 56 assigned to it.

The rcu_state structure 52 includes several individual data fields that are of interest to the present disclosure. One such field is an rsp→gpnum field 58 that stores the number of the most recently-started normal RCU grace period. Another field is an rsp→completed field 60 that stores the number of the most recently-ended normal RCU grace period. If these two numbers are equal, there is no normal RCU grace period in progress. If the number stored in the rsp→gpnum field 58 is one greater than the number stored in the rsp→completed field 60, there is a normal RCU grace period in progress.

A further field maintained by the rcu_state structure 52 is an rsp→gp_flags field 62 that stores flags used by the RCU grace period kthread. As described in more detail below, one of these flags, named RCU_GP_FLAG_INIT, may be set to indicate when a new normal RCU grace period is needed.

Each of the rcu_node structures 54 includes several data fields that are interest to the present disclosure. One such field is an rnp→lock 64. In the root rcu_node structure 54A, the rnp→lock 64 serializes access to the rcu_state structure's rsp→gpnum field 58, the rsp→completed field 60, and the rsp→gp_flags field 62. The rnp→lock 64 additionally serializes access to the various fields of the rcu_node structures themselves. These fields include an rnp→qsmask field 66, an rnp→gpnum field 68, and an rnp→completed field 70. The rnp→qsmask field 66 is a bitmask that stores quiescent state information for all processors 4 under the jurisdiction of a given rcu_node structure 54. For the leaf rcu_node structures 54B, each bit of the rnp→qsmask field 66 corresponds to one of the processors 4 that reports to that leaf rcu_node structure, and which is represented by one of the rcu_data structures 56. For the root rcu_node structure 54A and any other non-leaf rcu_node structure 54 that may be present in the rcu_node tree, each bit of the rnp→qsmask field 66 corresponds to one lower-level rcu_node structure.

The rnp→gpnum field 68 and the rnp→completed field 70 respectively store the number of the last-started normal RCU grace period and the number of the last-completed normal RCU grace period that are currently known to the rcu_node structure 54. These numbers will correspond to their counterparts in the rcu_state structure's rsp→gpnum field 58 and rsp→completed field 60, except at the beginning and end of RCU grace periods, when they may differ by at most one.

To see why this is so, consider that manipulations of the rnp→qsmask fields 66 that indicate RCU quiescent states propagate up the rcu_node tree in a leaf-to-root direction, whereas manipulations of the rnp→gpnum and rnp→completed fields 68 and 70 that indicate normal RCU grace periods propagate down the rcu_node tree in a root-to-leaf direction.

RCU quiescent states for each processor 4 are reported to the processor's assigned leaf rcu_node structure 54B by clearing the processor's bit in the leaf rcu_node structure's rnp→qsmask field 66. When all of the bits in a leaf rcu_node structure's rnp→qsmask field 66 are cleared, the quiescent state information is propagated to the next higher rcu_node structure level by clearing the leaf rcu_node structure's bit in its parent rcu_node structure's rnp→qsmask field 66. This quiescent state reporting process continues until the root rcu_node structure 54A is reached.

When all bits have been cleared in the root rcu_node structure's rnp→qsmask field 66, the current normal RCU grace period will end by incrementing the rcu_state structure's rsp→completed field 60. At this point, the number stored in the rnp→completed fields 70 will lag the number stored in the rsp→completed field 60 by one. However, as part of the RCU grace period cleanup operation performed by the RCU grace period core 36 (see FIG. 2), the grace period information stored in the rsp→completed field 60 will be propagated down the rcu_node tree from the root rcu_node structure 54A to the leaf rcu_node structures 54B, advancing each rcu_node structure's rnp→completed field 70.

When a new RCU grace period is started, the rcu_state structure's rsp→gpnum field 58 will be incremented. At this point, the number stored in the rnp→gpnum fields 68 will lag the number stored in the rsp→gpnum field 58 by one. However, as part of the RCU grace period initialization performed by the RCU grace period core 36 (see FIG. 2), the normal RCU grace period information stored in the rsp→gpnum field 58 will be propagated down the rcu_node tree from the root rcu_node structure 54A to the leaf rcu_node structures 54B, advancing each rcu_node structure's rnp→gpnum field 68.

With continuing reference to FIG. 3, the rcu_node structures 54 may further include an array named rnp→need_future_gp[ ] 72. This array is used to track requests for different future normal RCU grace periods needed for newly-posted RCU callbacks maintained by the rcu_data structures 56. In the illustrated embodiment, the rnp→need_future_gp[ ] array 72 is a four-element array of Boolean values, with each element indicating whether there has been a request for a particular future normal RCU grace period. Thus, the first array element signifies a request for a future normal RCU grace period that is one after the current normal RCU grace period, the second array element signifies a request for a future normal RCU grace period that is two after the current normal RCU grace period, and so on. As each future normal RCU grace period elapses, the corresponding element of the rnp→need_future_gp[ ] array 72 is zeroed at each rcu_node structure 54 during grace period cleanup operations. In other embodiments, the rnp→need_future_gp[ ] array 72 could be implemented as a two-element array, with each element being an integer rather than a Boolean value. In that case, the value of each element could indicate a count of number of requests for a particular normal RCU grace period.

The rcu_data structures 56 each include a segmented callback list 74 named rdp→cblist. The rdp→cblist 74 is used by the updaters 18 to post RCU callbacks via the RCU updater API 34 of FIG. 3. The rdp→cblist 74 contains a→head pointer that references the first callback (or is NULL if the callback list contains no callbacks) and four tail pointers that define the callback list segments. The →tails [RCU_DONE_TAIL] pointer references the end of a first callback list segment named RCU_DONE_TAIL for callbacks whose normal RCU grace periods have elapsed. The →tails [RCU_WAIT_TAIL] pointer references the end of a second callback list segment named RCU_WAIT_TAIL for callbacks that are waiting for the current normal RCU grace period to end. The →tails [RCU_NEXT_READY_TAIL] pointer references the end of a third callback list segment named RCU_NEXT_READY_TAIL for callbacks that are waiting for the next normal RCU grace period to start. The →tails [RCU_NEXT_TAIL] pointer references the end of a fourth callback list segment named RCU_NEXT_TAIL for callbacks that have not yet been associated with a normal RCU grace period. The rdp→cblist 74 also maintains a four-element→gp_seq array that records future normal RCU grace period sequence numbers corresponding to the callback list segments. This allows different processors 4 to have different ideas as to what is the current normal RCU grace period while avoiding premature invocation of their callbacks. The rdp→cblist 74 thus contains RCU callbacks in association with the normal RCU grace period numbers that determine when the callbacks may be invoked.

Existing Linux® RCU implementations have used a prior art function named rcu_cbs_completed( ) to calculate the future normal RCU grace period numbers that are maintained by the elements of each rnp→need_future_gp[ ] array 72. A function named rcu_start_future_gp( ) has been used to request those future normal RCU grace periods from the RCU grace period core 36. Unfortunately, the future RCU grace period request operation performed by rcu_start_future_gp( ) often entails acquisition of a global lock, namely, the rnp→lock 64 in the root rcu_node 54A. In systems with multiple processors, there can be excessive contention on the root rnp→lock 64, which can degrade RCU performance and limit scalability.

The present disclosure addresses the global lock contention problem by way of a funnel-locking technique to request future normal RCU grace periods from the RCU grace period core 36. The disclosed funnel-locking technique utilizes the rcu_node tree, starting from whichever rcu_node structure 54 the grace-period requester happens to be accessing when funnel locking is initiated. After verifying that the current rcu_node structure's rnp→lock 64 is held, the funnel-locking operation traverses the rcu_node tree in a leaf-to-root direction. The funnel-locking operation checks the future normal RCU grace period information maintained by the rcu_node structure's rnp→need_future_gp[ ] array 72 to determine whether the need for the future normal RCU grace period was previously recorded at this rcu_node structure 54. If it has, the tree traversal may be terminated. The funnel-locking operation can only reach the root rcu_node and acquire its rnp→lock only if no other invocation of the funnel-locking operation to request the same future normal RCU grace period has already done so.

Funnel locking has been applied in other areas of Linux®-based RCU, for example, to mediate requests for expedited RCU grace periods and for SRCU (Sleepable RCU) grace periods. Expedited RCU grace period processing differs from normal RCU grace period processing in that the former utilizes interprocessor interrupts (IPIs) delivered to processors to force processor quiescent states. As such, expedited RCU grace periods can be orders of magnitude faster than normal RCU grace periods, which are non-expedited and do not use IPIs. SRCU grace period processing differs from normal RCU grace period processing in that the former is performed on a subsystem-by-subsystem basis, such that the number of memory blocks awaiting an SRCU grace period is bounded. SRCU has been historically used for low-update-rate situations. In existing Linux® RCU implementations, normal RCU grace periods are tracked separately from expedited RCU grace periods and from an SRCU grace periods.

The presently-disclosed funnel-locking technique is thus optimized to handle requests for normal RCU grace periods. These optimizations result from applicant's observation that certain special complications that must be addressed if funnel locking is to be used for normal RCU grace period requests. Such complications are not present in the other RCU funnel-locking environments used for expedited RCU grace periods and for SRCU grace periods.

One complication stems from applicant's observation that the global lock-contention (for the root rnp→lock 64) that occurs in the context of requesting future normal RCU grace periods is caused only in part by the lack of funnel locking. Contention is also due to the non-event-driven heritage of the Linux® RCU implementation, which involves certain "fail-safe" checks of the need for a normal RCU grace period. Some of these fail-safe checks acquire the root rnp→lock 64. In an embodiment, these fail-safe checks may be mostly eliminated by modifying certain RCU functions that have implemented them.

A further complication stems from applicant's observation that failure hold the initial rcu_node structure's rnp→lock 64 throughout and after the funnel-locking operation may result in destructive races with normal RCU grace period initialization and cleanup. However, failure to release the rnp→lock 64 of any other non-root rcu_node structure 54 acquired during the funnel-locking operation may delay concurrent requesters of future normal RCU grace periods seeking to access the locked rcu_node structures. In an embodiment, the disclosed funnel locking technique handles these locking issues.

Applicant has observed that the funnel-locking operation need not proceed past a given rcu_node structure 54 if that structure is a not a leaf rcu_node structure 54A and believes that there is a normal RCU grace period already in progress. In an embodiment, traversal of the rcu_node tree is discontinued in response to this condition. This optimization is enabled by the fact that when the current normal RCU grace period ends, the usual end-of-grace-period scan of all rcu_node structures performed by the grace period cleanup operation that will detect the future normal-grace period request at the leaf rcu_node structure 54A.

Applicant has further observed that the funnel-locking operation need not proceed past a given rcu_node structure 54 if that structure believes that the specified grace period has already started. In an embodiment, traversal of the rcu_node tree is discontinued in response to this condition. This optimization is enabled by providing an improvement in the accuracy of the rcu_cbs_completed( ) function's estimate of which grace period must complete before a new RCU callback may be safely invoked (as discussed in more detail below).

The funnel-locking operation may in some cases be started at the root rcu_node structure 54A, and this case must be handled correctly. In particular, the root rcu_node structure's rnp→lock 64 must be held throughout and after the funnel-locking operation. The reason for this special case is that code already holding the root rcu_node structure's rnp→lock 64 sometimes notices a need for an additional normal RCU grace period and must therefore record its own future normal RCU grace period request. In an embodiment, this condition is handled by allowing funnel-locking operation to commence at any rcu_node structure 54, including the root rcu_node structure 54A.

As discussed above, requests for future normal RCU grace periods using the disclosed funnel locking technique may be facilitated by improving the accuracy of the computation used to compute a future normal RCU grace period after which it will be safe to invoke new RCU callbacks. In past Linux RCU implementations, this computation has been performed by the rcu_cbs_completed( ) function. In theory, it is acceptable for rcu_cbs_completed( ) to return a later normal RCU grace period than absolutely necessary because if it is safe to invoke a given RCU callback at a given time, it is also safe to invoke that callback at any later time. In practice, there are penalties, for example, in the form of degraded performance, energy efficiency, and normal-grace-period latency. It is therefore advantageous for rcu_cbs_completed( ) to be as accurate as possible.

Past implementations of the rcu_cbs_completed( ) function have traded off accuracy to reduce lock contention. In these prior art implementations, the rcu_cbs_completed( ) function has unconditionally assumed that two normal RCU grace periods are needed if the function is invoked on a non-root rcu_node structure 54. However, if there is no normal RCU grace period actually in progress, only one additional normal RCU grace period is needed. The rationale is that only the root rcu_node structure 54A knows exactly which normal RCU grace period is in flight. The other rcu_node structures 54 are informed of changes only after the fact. A simple way to obtain perfect accuracy would be to always refer to the root rcu_node structure 54A, but doing so could result in excessive contention on that structure's rnp→lock 64. This contention can be largely avoided by having the rcu_cbs_completed( ) function instead refer to a leaf rcu_node structure 54B, but this means that a newly started or newly completed normal RCU grace period will not be taken into account, resulting in a request for an additional unnecessary normal RCU grace period along with unnecessarily long grace-period latencies for new callbacks.

Past implementations of the rcu_cbs_completed( ) function split the difference by checking the rcu_node structure 54 on which they were invoked. If the function was invoked on the root rcu_node structure 54A when no normal RCU grace period is in progress, one additional normal RCU grace period is requested. Otherwise, two additional normal RCU grace periods are requested.

Figure 4:
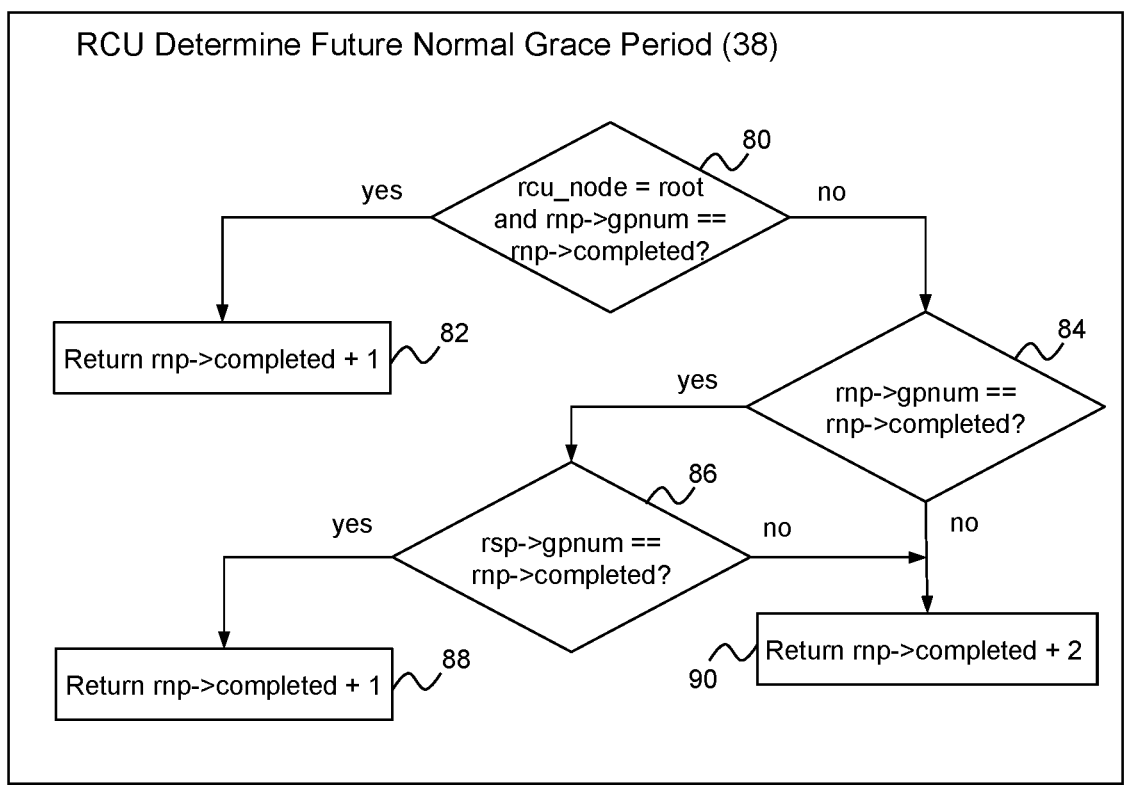
FIG. 4 is a flow diagram showing example processing that may be used to calculate a normal future RCU grace period in accordance with an embodiment of the present disclosure.

Turning now to FIG. 4, an embodiment of the component 38 of FIG. 2 ("RCU determine future normal grace period") is shown. The operations of component 38 improve on the prior art rcu_cbs_completed( ) function by providing a more accurate future normal RCU grace period calculation. In FIG. 4, block 80 checks whether the root rcu_node structure 54B is being referenced and believes there is no normal RCU grace period in progress due the rnp→gpnum field 68 being equal to the rnp→completed field 70. In that case, block 82 returns the value rnp→completed+1 to indicate that the required normal RCU grace period is one greater than the last known completed normal RCU grace period. Otherwise, block 84 checks whether the current non-root rcu_node structure 54 believes there is no normal RCU grace period in progress due the rnp→gpnum field 68 being equal to the rnp→completed field 70. If so, block 86 performs a lockless check of the rcu_state structure 52 to verify whether that structure also believes there is no normal RCU grace period in progress due the rsp→gpnum field 58 being equal to the rnp→completed field 70 of the current rcu_node structure 54. In that case, block 88 returns the value rnp→completed+1 to indicate that the required normal RCU grace period is one greater than the last known completed normal RCU grace period. Block 90 is reached if either the current rcu_node structure 54 or the rcu_state structure 52 believe that a new normal RCU grace period has started. In that case, block 90 returns the value rnp→completed+2 to indicate that the required normal RCU grace period is two greater than the last known completed normal RCU grace period.

Before discussing the funnel locking operation disclosed herein in more detail, it will be instructive to consider the prior art methodology used by previous Linux® RCU implementations (including kernel version 4.17.19, circa August 2017) to request normal RCU grace periods for new RCU callbacks. This prior art methodology is embodied in an RCU function named rcu_start_future_gp( ).

The rcu_start_future_gp( ) function has been invoked by another Linux® RCU function named rcu_accelerate_cbs( ). The rcu_accelerate_cbs( ) function has been used historically to assign a future normal RCU grace period number to any callbacks on a processor that do not have a grace period number already assigned. It invokes the rcu_start_future_gp( ) function to calculate the required normal RCU grace period number and record a need for that grace period using the rcu_node tree, and if necessary, to accelerate any callbacks that were previously assigned a future normal RCU grace period number that has since proven to be too conservative. When its operations are completed, the rcu_start_future_gp( ) function returns to its caller with an indication of whether or not a new normal RCU grace period needs to be started, setting appropriate state in the rsp→gp_flags field 62 of the rcu_state structure 52 if a new normal RCU grace period is in fact needed.

The rcu_start_future_gp( ) function makes use of only the leaves and root of the rcu_node tree, and suffers from the disadvantage of having to acquire the root rnp→lock 64 in the common case where no normal RCU grace period is currently in progress. As previously discussed, this contributes to contention for this global lock.

Consider, for example, that although the rcu_accelerate_cbs( ) function is the most frequent caller of rcu_start_future_gp( ), the rcu_accelerate_cbs( ) function has itself been called by at least six other functions in various Linux® RCU implementations. These functions include rcu_advance_cbs( ), _note_gp_changes( ), rcu_gp_cleanup( ), rcu_report_qs_rdp( ), _rcu_process_callbacks( ), and _call_rcu_core( ). In addition, a function named rcu_nocb_wait_gp( ) has been used to directly call the rcu_start_future_gp( ) function in situations involving no-CBs processors that do not process RCU callbacks. The frequency of rcu_start_future_gp( ) invocation is thus far from trivial.

Figure 5:
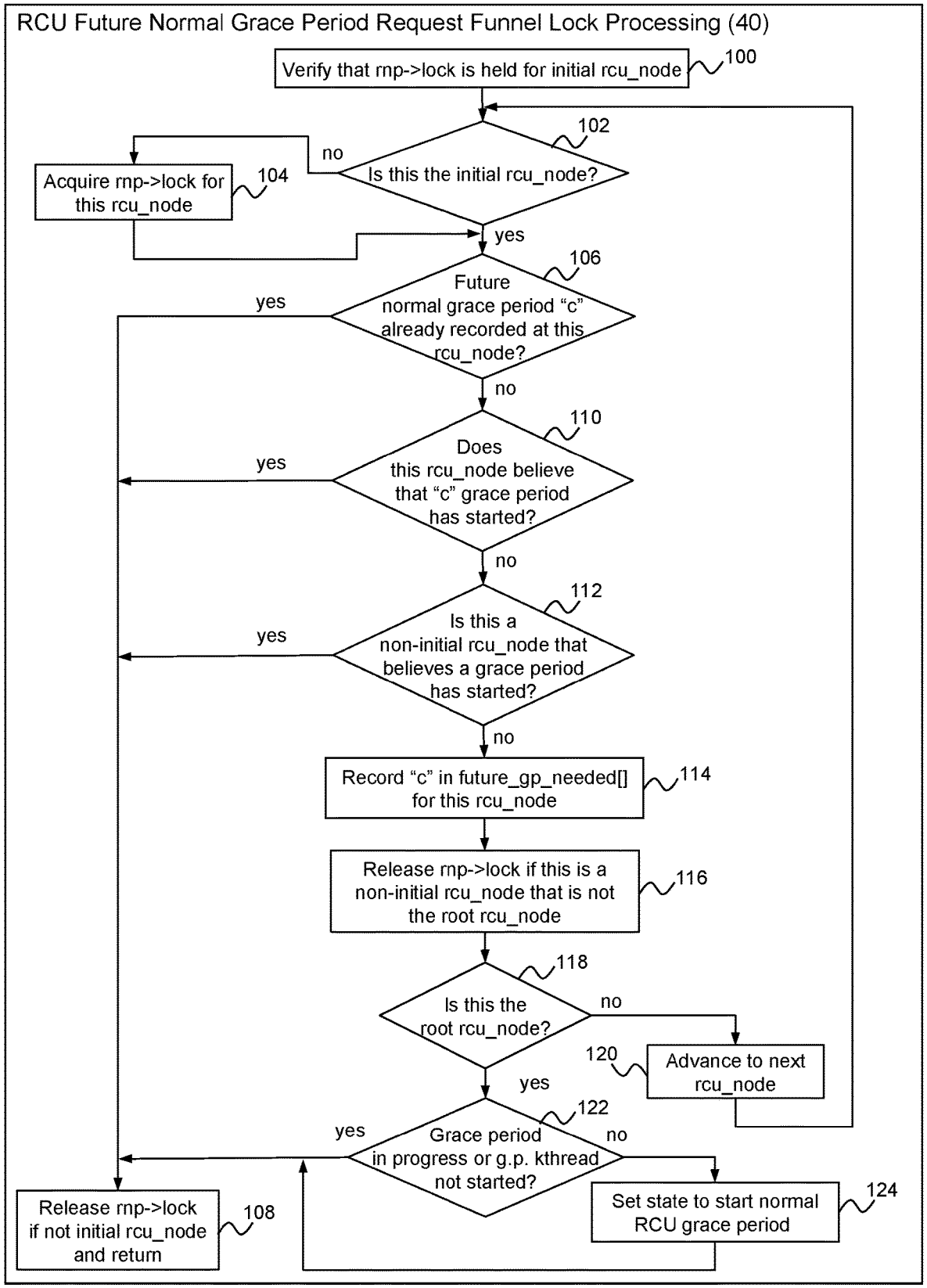
FIG. 5 is a flow diagram showing example funnel-lock processing that may be used to request a future normal RCU grace period in accordance with the present disclosure.

Turning now to FIG. 5, an embodiment of the component 40 of FIG. 2 (RCU future normal grace period request funnel lock processing") is shown. The funnel-lock operations of component 40 may serve as a replacement for the prior art rcu_start_future_gp( ) function referred to above. It may be called by the previously described Linux® RCU function named rcu_accelerate_cbs( ) that is used to assign a future normal RCU grace period number to any callbacks on a processor that have not a grace period number already assigned. The rcu_start_this_gp( ) records the future RCU grace period number using the rcu_node tree as a funnel lock, then returns to its caller with an indication of whether or not a new normal RCU grace period needs to be started, setting appropriate state in the rsp→gp_flags field 62 of the rcu_state structure 52 if a new grace period is needed.

Unlike the prior art rcu_start_future_gp( ) function, the component 40 does not need to accelerate any callbacks that were previously assigned a future normal RCU grace period number that has since proven to be too conservative. This is because the component 40 relies on the more accurate future normal grace period calculation provided by the component 38. The component 40 also does not have to be started on a leaf rcu_node structure 54A. The function can be started on any rcu_node structure 54, including the root rcu_node structure 54A. Importantly, the component 40 does not suffer from the disadvantage of having to acquire the root rnp→lock 64, and thus does not contribute to contention for that lock.

The parameters passed to the component 40 are a pointer to an initial rcu_node structure 54 (whose rnp→lock 64 is acquired by the caller), a pointer to an rcu_data structure 56 within the jurisdiction of the initial rcu_node structure, and an unsigned long integer "c" representing a future normal RCU grace period number. It is the responsibility of the caller that invokes the component 40 to have previously invoked the component 38 in order to generate the future RCU grace period number represented by the "c" parameter.

In FIG. 5, block 100 verifies that the rnp→lock 64 is held for the initial rcu_node structure 54 passed as a function parameter. This lock may be held throughout the funnel-locking procedure in order to avoid destructive races with grace-period initialization and cleanup operations performed by the RCU grace period core 36 (FIG. 2).

Block 102 starts a loop that implements a funnel-lock traversal of the rcu_node tree. This funnel-lock traversal begins at the initial rcu_node structure 54 and attempts to walk the tree in a leaf-to-direction toward the root rcu_node structure 54A. At each rcu_node structure 54, the funnel-lock traversal either records the future normal RCU grace period represented by the "c" parameter passed to the rcu_start_this_gp( ) function, or terminates the rcu_node tree traversal if certain condition checks indicate that it is appropriate to do so.

In block 102, a determination is made whether the current rcu_node structure 54 is the initial rcu_node structure. If not, it means that the funnel-locking rcu_node tree traversal has moved past the initial rcu_node structure 54. In that case, block 104 acquires the rnp→lock 64 of the current rcu_node structure 54. In an embodiment, the rnp→lock 64 of any non-initial rcu_node structure 54 may be held only while accessing that rcu_node structure, and may be subsequently released before acquiring the rnp→lock of any other rcu_node structure.

Block 106 is reached following block 104 or if block 102 determines that the current rcu_node structure 54 is the initial rcu_node structure (whose rnp→lock 64 is already held). Block 106 is the first of three condition checks (performed by blocks 106, 110 and 112) to determine if the funnel-lock traversal may be terminated. The check performed by block 106 is whether a first condition exists wherein the future normal RCU grace period "c" passed as a function parameter has already been requested at the current rcu_node structure 54 (e.g., by virtue of the future RCU grace period "c" being recorded in the current rcu_node structure's rnp→need_future_gp[ ] array 72). Recalling that the rnp→need_future_gp[ ] array 72 may be implemented as a four-element array, the array element corresponding to "c" may be determined from the two-low order bits of "c" (e.g., as rnp→need_future_gp[c & 0x3]).

Responsive to block 106 determining that the first condition exists (due to the future normal RCU grace period "c" having already been requested at the current rcu_node structure 54), the funnel-lock traversal is terminated and control passes to block 108. In block 108, the current rcu_node structure's rnp→lock 64 may be released. The rcu_start_this_gp( ) function then returns to the caller with a default Boolean return value indicating there is no need to start a new normal RCU grace period.

If block 106 determines that the future normal RCU grace period "c" has not been recorded at the current rcu_node structure 54, block 110 checks whether a second condition exists wherein the current rcu_node structure 54 believes that the future normal RCU grace period "c" has already started. This operation may be performed by comparing the current rcu_node structure's rnp→gpnum field 68 (representing current normal RCU grace period information maintained by the rcu_node structure) to determine if it is greater than or equal to "c." Responsive to block 110 determining that the second condition exists (due to the future normal RCU grace period "c" having already started), the funnel-lock traversal is terminated and control passes to block 108 to release the current rcu_node structure's rnp→lock 64 and return to the caller with a default Boolean return value indicating there is no need to start a new RCU grace period.

If block 110 determines that the future normal RCU grace period "c" has not yet started, block 112 checks to determine whether the current rcu_node structure 54 is not the initial rcu_node structure 54, and a third condition exists wherein the current rcu_node structure believes that any normal RCU grace period is currently underway. The third condition may be checked by comparing the current rcu_node structure's rnp→gpnum field 68 against its rnp→completed field 70 (both representing current RCU grace period information maintained by the rcu_node structure) to determine if they are non-equal.

Responsive to block 112 determining that a normal RCU grace period is currently underway, the funnel-lock traversal is terminated and control passes to block 108 to release the current rcu_node structure's rnp→lock 64 and return to the caller with a default Boolean return value indicating there is no need to start a new RCU grace period. The rationale for this optimization is that the initial rcu_node structure 54 will have already recorded the future normal RCU grace period "c" during previous funnel-locking processing of that rcu_node structure (i.e., in block 114, described below). This recordation will be subsequently noted by scanning performed as part of the grace period cleanup operation implemented by the RCU grace period core 36 (FIG. 5) at the end of the current normal RCU grace period. In an embodiment, a Linux® RCU function named rcu_gp_cleanup( ) may be used to perform the grace period cleanup operation.

Block 114 is reached from the "no" pathway of block 112, meaning that neither the first condition, the second condition, nor the third condition have been determined to exist. Block 154 records the future normal RCU grace period "c" in the corresponding element of the current rcu_node structure's rcu_need_future_gp[ ] array 72. Note that the grace period cleanup operation will subsequently clear this recorded element of the rcu_need_future_gp[ ] array 72 upon completion of the normal RCU grace period corresponding to "c."

Block 116 releases the rnp→lock 64 for the current rcu_node structure 54, but only if it is neither the initial rcu_node structure 54 nor the root rcu_node structure 54A.

Block 118 checks whether the current rcu_node structure 54 is the root rcu_node structure 54A. If it is not, block 120 advances to the next rcu_node structure 54 (which is the parent of the current rcu_node structure), and control returns to block 102 for the next pass through the funnel-lock traversal loop.

If block 118 determines that the current rcu_node structure 54 is the root rcu_node structure 54A, the funnel-lock traversal has reached its end point. Control passes to block 12₂ with the root rnp→lock 64 (which will have been acquired in block 104) being held. In block 122, the root rcu_node structure's rnp→gpnum field 68 is compared to the rnp→completed field 70 to determine whether a normal RCU grace period is currently in progress. A check is also made whether the RCU grace period kthread has not been started. If either condition is detected, control passes to block 108 to release the root rcu_node structure's rnp→lock 64 and return to the caller with a default Boolean return value indicating there is no need to start a new normal RCU grace period. Otherwise, if there is no normal RCU grace period in progress and the RCU grace period kthread has been started, block 124 sets appropriate state in the rsp→gp_flags field 62 of the rcu_state structure 52 to signify that a new normal RCU grace period is needed. Control then passes to block 108, which will release the root rcu_node structure's rnp→lock 64, and in this instance, return a non-default Boolean value indicating that the RCU grace period kthread needs to be awakened in order to start a new normal RCU grace period.

It will be seen from the foregoing description that the funnel-lock operations implemented by the component 40 of FIG. 5 does not require acquisition of the rnp→lock 64 of the root rcu_node structure 54A unless and until the funnel-lock traversal progresses to the root rcu_node structure. This should normally occur for only a small percentage of rcu_start_this_gp( ) invocations. If there are multiple invocations of the rcu_need_this_gp( ) function that each seek to record the same future normal RCU grace period "c," only one invocation needs to reach the root rcu_node structure 54A. The other invocations may piggy-back off the first invocation, terminating their funnel-lock traversal before reaching the root rcu_node structure 54A due to the check performed in block 106 of FIG. 5. Any invocation of the component 40 may likewise terminate via blocks 110 and 112 prior to reaching the root rcu_node structure 54A. In this way, contention for the root rcu_node structure's rnp→lock 64 will be greatly reduced.

Contention for the rnp→lock 64 of the root rcu_node structure 54A may be further reduced by eliminating certain fail-safe checks of the need for a normal RCU grace period, some which have in the past acquired the root rcu_node structure's rnp→lock 64. These fail-safe checks may be eliminated by making judicious use of the component 40 in order to utilize its funnel-lock operations to reduce contention for the root rcu_node structure 54A.

One such fail-safe check has been performed by prior art implementations of the Linux® RCU function named call_rcu_core( ). The prior art _call_rcu_core( ) function responds to a processor 4 having an excessive number of RCU callbacks by checking to see if an RCU grace period is in progress. If not, the _call_rcu_core( ) function unconditionally acquires the root rcu_node structure's rnp→lock 64 and attempts to start a new grace period. This adds to contention for this global lock, and is also counterproductive should the RCU grace period kthread be attempting to acquire the same lock in order to start a new RCU grace period. As a proposed solution, the _call_rcu_core( ) unction may be modified to instead acquire the rnp→lock 64 of the current processor's leaf rcu_node structure 54B, and then invoke a modified version of a Linux® RCU function named rcu_accelerate_cbs( ). As previously noted, the rcu_accelerate_cbs( ) function has been used historically to assign a future normal RCU grace period number to RCU callbacks on a processor that do not already have one.

A modified form of the rcu_accelerate_cbs( ) function may invoke the component 38 to calculate a future normal RCU grace period to be assigned to a processor's new callbacks. The rcu_accelerate_cbs( ) function may thereafter invoke the component 40 to request the future normal RCU grace period and to set the appropriate state for starting a new normal RCU grace period if one is needed. The advantage of this new approach is that in the common case where the need for the future normal RCU grace period has already been recorded, the root rcu_node structure's rnp→lock 64 need not be acquired at all.

Other fail-safe checks that have in the past acquired the root rcu_node structure's rnp→lock 64 have been necessitated by a prior art implementation of the Linux® RCU function named rcu_gp_cleanup( ) which is implemented by the RCU grace period core 36 (FIG. 2) to clean up at the end of a normal RCU grace period. One reason that prior art versions of the rcu_gp_cleanup( ) function have necessitated fail-safe checks is that the function does not always accurately determine whether an additional grace period is required. Such prior art implementations of the rcu_gp_cleanup( ) function scan the rcu_node tree in order to reset state in each rcu_node structure 54 to reflect the end of a normal RCU grace period. The prior art rcu_gp_cleanup( ) function also checks the need_future_gp[ ] array 74 of each rcu_node structure 54 to determine whether a new normal RCU grace period is needed. However, in a number of cases, rather than directly cause the new normal RCU grace period to be immediately started, it instead leaves the grace-period-needed state information intact to be handled by the fail-safe checks.

This problem may be remedied by adding an end-of-grace-period check of the root rcu_node structure's need_future_gp[ ] array 72 for future normal RCU grace periods that may still be needed, and invoking the modified version of the rcu_accelerate_cbs( ) function to reduce false positives. As discussed above, the modified rcu_acceleration_cbs( ) function may invoke the components 38 and 40. In this instance, the component 40 will start while holding the root rcu_node structure's rnp→lock 64. Without the added check of the root rcu_node structure's need_future_gp[ ] array 72 for future normal RCU grace periods that may still be needed, if a request for a new normal RCU grace period arrives after the rcu_gp_cleanup( ) function's breadth-first sweep of the rcu_node tree, but before the final acquisition of the root rcu_node structure's rnp→lock 64, the future normal RCU grace period recordings performed by the funnel-lock operations of the component 40.

Another cause of fail-safe checks that have in the past acquired the root rcu_node structure's rnp→lock is a prior art implementation of the Linux® RCU function named rcu_process_callbacks( ). The prior art rcu_process_callbacks( ) function (which is the RCU_SOFTIRQ handler) checks to see if the current processor 4 needs a normal RCU grace period, and also if there is any other reason to start a new normal RCU grace period. This is one of the fail-safe checks that has been rendered unnecessary by the above-described changes that increase the accuracy of the rcu_gp_cleanup( ) function's estimate as to whether another normal RCU grace period is required. However, one additional fail-safe check performed by the prior art _rcu_process_callbacks( ) function involves acquiring the root rcu_node structure's rnp→lock 64 to start a new normal RCU grace period on behalf of newly arrived RCU callbacks that have not yet been associated with a grace period. This global lock acquisition may be avoided by instead acquiring the current processor's leaf rcu_node structure's rnp→lock 64, and calling the modified version of the rcu_accelerate_cbs( ) function (discussed above) that in turn may invoke the components 38 and 40.

Accordingly, a funnel-locking technique for normal RCU grace period requests has been disclosed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. A computer-implemented method, comprising:
 calculating a future normal RCU grace period based on the status of a current RCU grace period;
 initiating a traversal of a funnel lock embodied as a hierarchical tree of nodes having a single top level root node, one or more bottom level leaf nodes, and zero or more intermediate level nodes;
 the funnel-lock traversal starting at an initial node whose node lock is held throughout the funnel-lock traversal;
 for each node accessed during the funnel-lock traversal that is not the initial node, holding a node lock on the node while accessing that node;
 for each node accessed during the funnel-lock traversal, checking future normal RCU grace period request information maintained by the node to determine whether a first condition exists wherein the future normal RCU grace period has already been requested at that node, and responsive to the first condition being determined to exist, terminating the funnel-lock traversal;
 for each node accessed during the funnel-lock traversal, checking current normal RCU grace period information maintained by the node to determine whether a second condition exists wherein the future normal RCU grace period as already started, and responsive to the second condition being determined to exist, terminating the funnel-lock traversal;
 for each node accessed during the funnel-lock traversal that is not the initial node, checking the current normal RCU grace period information maintained by the node to determine whether a third condition exists wherein any normal RCU grace period is currently underway, and responsive to the third condition being determined to exist, terminating the funnel-lock traversal; and
 for each node accessed during the funnel-lock traversal wherein neither the first condition, the second condition, nor the third condition are determined to exist, updating the future normal RCU grace period request information maintained by the node to record a request for the future normal RCU grace period.

2. The method of claim 1, wherein the funnel-lock traversal starts at a non-root node of the hierarchical tree of nodes.

3. The method of claim 1, wherein the funnel-lock traversal starts the root node of the hierarchical tree of nodes.

4. The method of claim 1, wherein the node lock of each node that is not the initial node is released in response to terminating the funnel-lock traversal at that node, but wherein the node lock of the initial node is held in response to terminating the funnel-lock traversal.

5. The method of claim 1, wherein state is set to start a normal RCU grace period in response to accessing the root node and determining that a normal RCU grace period is not in progress and a grace period kernel thread has been started.

6. The method of claim 1, wherein the future RCU grace period is calculated as being one normal RCU grace period following the current RCU grace period in response to:
 the node lock of the root node being held and the current normal RCU grace period information maintained by the root node indicating there is no normal RCU grace period currently in progress; or
 the node lock of a non-root node being held and the current normal RCU grace period information maintained by the non-root node indicating there is no normal RCU grace period currently in progress, and a non-locking check of current normal RCU grace period information maintained by a global RCU state structure confirming there is no normal RCU grace period in progress.

7. The method of claim 6, wherein the future RCU future RCU grace period is calculated as being two normal RCU grace periods following the current RCU grace period in response to:
- either the node lock of the root node or a non-root node being held, and the current normal RCU grace period information maintained by the root node or the non-root node indicating there is a normal RCU grace period currently in progress; or
- the node lock of a non-root node being held, the current normal RCU grace period information maintained by the non-root node indicating there is no normal RCU grace period currently in progress, but a non-locking check of current normal RCU grace period information maintained by a global RCU state structure indicating there is in fact a normal RCU grace period in progress.

8. A system, comprising:
- a plurality of processors;
- a computer readable storage medium;
- program instructions stored on the computer readable storage medium for execution by one or more of the processors to perform funnel-locking operations for normal read-copy update (RCU) grace period requests, the operations comprising:
- calculating a future normal RCU grace period based on the status of a current RCU grace period;
- initiating a traversal of a funnel lock embodied as a hierarchical tree of nodes having a single top level root node, one or more bottom level leaf nodes, and zero or more intermediate level nodes;
- the funnel-lock traversal starting at an initial node whose node lock is held throughout the funnel-lock traversal;
- for each node accessed during the funnel-lock traversal that is not the initial node, holding a node lock on the node while accessing that node;
- for each node accessed during the funnel-lock traversal, checking future normal RCU grace period request information maintained by the node to determine whether a first condition exists wherein the future normal RCU grace period has already been requested at that node, and responsive to the first condition being determined to exist, terminating the funnel-lock traversal;
- for each node accessed during the funnel-lock traversal, checking current normal RCU grace period information maintained by the node to determine whether a second condition exists wherein the future normal RCU grace period as already started, and responsive to the second condition being determined to exist, terminating the funnel-lock traversal;
- for each node accessed during the funnel-lock traversal that is not the initial node, checking the current normal RCU grace period information maintained by the node to determine whether a third condition exists wherein any normal RCU grace period is currently underway, and responsive to the third condition being determined to exist, terminating the funnel-lock traversal; and
- for each node accessed during the funnel-lock traversal wherein neither the first condition, the second condition, nor the third condition are determined to exist, updating the future normal RCU grace period request information maintained by the node to record a request for the future normal RCU grace period.

9. The system of claim 8, wherein the funnel-lock traversal starts at a non-root node of the hierarchical tree of nodes.

10. The system of claim 8, wherein the funnel-lock traversal starts the root node of the hierarchical tree of nodes.

11. The system of claim 8, wherein the node lock of each node that is not the initial node is released in response to terminating the funnel-lock traversal at that node, but wherein the node lock of the initial node is held in response to terminating the funnel-lock traversal.

12. The system of claim 8, wherein state is set to start a normal RCU grace period in response to accessing the root node and determining a normal RCU grace period is not in progress and a grace period kernel thread has been started.

13. The system of claim 8, wherein the future RCU grace period is calculated as being one normal RCU grace period following the current RCU grace period in response to:
- the node lock of the root node being held and the current normal RCU grace period information maintained by the root node indicating there is no normal RCU grace period currently in progress; or
- the node lock of a non-root node being held and the current normal RCU grace period information maintained by the non-root node indicating there is no normal RCU grace period currently in progress, and a non-locking check of current normal RCU grace period information maintained by a global RCU state structure confirming there is no normal RCU grace period in progress.

14. The system of claim 13, wherein the future RCU future RCU grace period is calculated as being two normal RCU grace periods following the current RCU grace period in response to:
- either the node lock of the root node or a non-root node being held, and the current normal RCU grace period information maintained by the root node or the non-root node indicating there is a normal RCU grace period currently in progress; or
- the node lock of a non-root node being held, the current normal RCU grace period information maintained by the non-root node indicating there is no normal RCU grace period currently in progress, but a non-locking check of current normal RCU grace period information maintained by a global RCU state structure indicating there is in fact a normal RCU grace period in progress.

15. A computer program product, comprising:
- a computer readable storage medium;
- program instructions stored on the computer readable storage medium for execution by a processor to perform funnel-locking operations for normal read-copy update (RCU) grace period requests, the operations comprising:
- calculating a future normal RCU grace period based on the status of a current RCU grace period;
- initiating a traversal of a funnel lock embodied as a hierarchical tree of nodes having a single top level root node, one or more bottom level leaf nodes, and zero or more intermediate level nodes;
- the funnel-lock traversal starting at an initial node whose node lock is held throughout the funnel-lock traversal;
- for each node accessed during the funnel-lock traversal that is not the initial node, holding a node lock on the node while accessing that node;
- for each node accessed during the funnel-lock traversal, checking future normal RCU grace period request information maintained by the node to determine whether a first condition exists wherein the future normal RCU grace period has already been requested at that node, and responsive to the first condition being determined to exist, terminating the funnel-lock traversal;

for each node accessed during the funnel-lock traversal, checking current normal RCU grace period information maintained by the node to determine whether a second condition exists wherein the future normal RCU grace period as already started, and responsive to the second condition being determined to exist, terminating the funnel-lock traversal;

for each node accessed during the funnel-lock traversal that is not the initial node, checking the current normal RCU grace period information maintained by the node to determine whether a third condition exists wherein any normal RCU grace period is currently underway, and responsive to the third condition being determined to exist, terminating the funnel-lock traversal; and for each node accessed during the funnel-lock traversal wherein neither the first condition, the second condition, nor the third condition are determined to exist, updating the future normal RCU grace period request information maintained by the node to record a request for the future normal RCU grace period.

16. The computer program product of claim 15, wherein the funnel-lock traversal starts at a non-root node of the hierarchical tree of nodes.

17. The computer program product of claim 15, wherein the funnel-lock traversal starts the root node of the hierarchical tree of nodes.

18. The computer program product of claim 15, wherein the node lock of each node that is not the initial node is released in response to terminating the funnel-lock traversal at that node, but wherein the node lock of the initial node is held in response to terminating the funnel-lock traversal.

19. The computer program product of claim 15, wherein state is set to start a normal RCU grace period in response to accessing the root node and determining a normal RCU grace period is not in progress and a grace period kernel thread has been started.

20. The system of claim 15, wherein the future RCU grace period is calculated as being one normal RCU grace period following the current RCU grace period in response to:

the node lock of the root node being held and the current normal RCU grace period information maintained by the root node indicating there is no normal RCU grace period currently in progress; or the node lock of a non-root node being held and the current normal RCU grace period information maintained by the non-root node indicating there is no normal RCU grace period currently in progress, and a non-locking check of current normal RCU grace period information maintained by a global RCU state structure confirming there is no normal RCU grace period in progress; and wherein the future RCU future RCU grace period is calculated as being two normal RCU grace periods following the current RCU grace period in response to:

either the node lock of the root node or a non-root node being held, and the current normal RCU grace period information maintained by the root node or the non-root node indicating there is a normal RCU grace period currently in progress; or the node lock of a non-root node being held, the current normal RCU grace period information maintained by the non-root node indicating there is no normal RCU grace period currently in progress, but a non-locking check of current normal RCU grace period information maintained by a global RCU state structure indicating there is in fact a normal RCU grace period in progress.

* * * * *